United States Patent [19]
Lapointe

[11] Patent Number: 5,860,253
[45] Date of Patent: Jan. 19, 1999

[54] COLLAPSIBLE POST STRUCTURE

[76] Inventor: Jean Lapointe, 50, boul. Saint-Elzear Quest, Laval, Québec, Canada, H7L 3K1

[21] Appl. No.: 835,875

[22] Filed: Apr. 8, 1997

[51] Int. Cl.$^6$ ....................................................... F16B 7/00
[52] U.S. Cl. ............................ 52/98; 52/726.3; 52/726.4; 52/736.1; 248/548; 248/900; 403/2; 403/297; 403/362
[58] Field of Search .......................... 52/98, 726.3, 726.4, 52/736.1; 248/548, 900; 403/2, 362, 297, 292; 40/606, 607

[56] References Cited

U.S. PATENT DOCUMENTS 5,160,111 11/1992 Hugron .
5,277,146 1/1994 Hughes, Jr. .

*Primary Examiner*—Robert Canfield
*Attorney, Agent, or Firm*—Swabey Ogilvy Renault

[57] ABSTRACT

A collapsible post structure having a frangible region that allows the post to collapse when the latter is struck. The post structure includes an elongated anchoring member. The anchoring member having an anchoring member hollow section that extends longitudinally into one longitudinal end thereof and defining an anchoring member inner surface. The post structure also includes an elongated supporting member. The supporting member having a supporting member hollow section that extends longitudinally into one longitudinal end thereof and defining a supporting member inner surface. The post structure further includes a connecting component, the connecting component having a connecting component first section and a connecting component second section. The connecting component first section and the connecting component second section are configured and sized so as to be respectively insertable into the anchoring member hollow section and the supporting member hollow section. The connecting component first section and the connecting component second section respectively define a first friction surface and a second friction surface. The supporting member is frictionally attached in end-to-end relationship to the anchoring component by the connecting component with the first friction surface frictionally contacting the anchoring member inner surface and the second friction surface frictionally contacting the supporting member inner surface. The anchoring member and the supporting member having a greater resistance to impact than the connecting component.

27 Claims, 10 Drawing Sheets

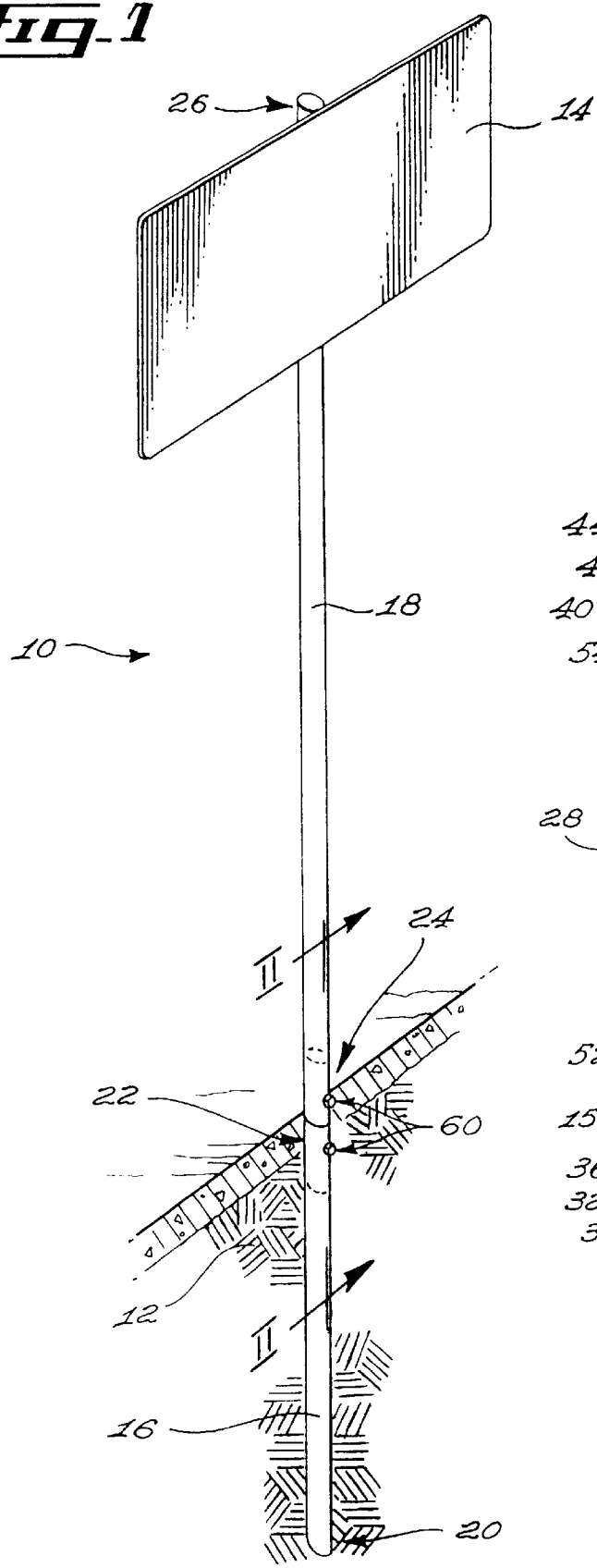
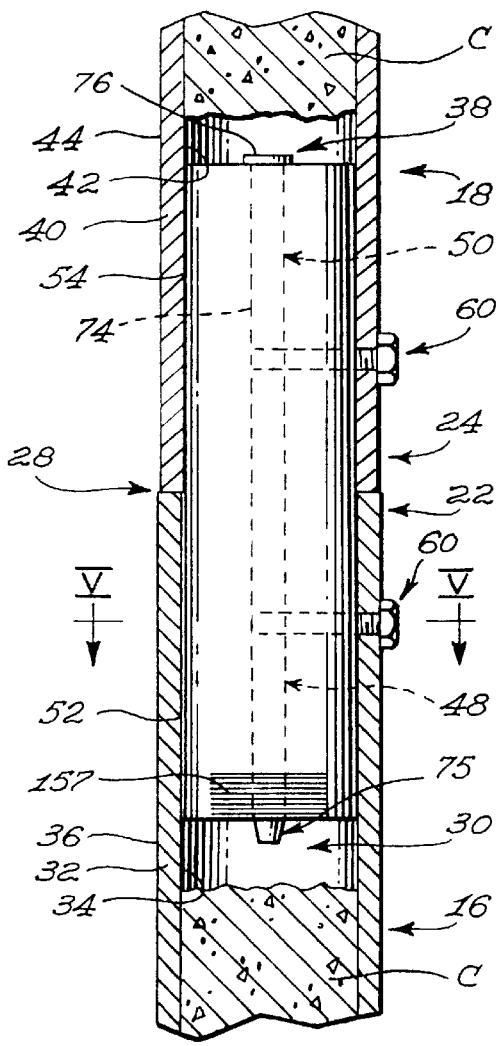

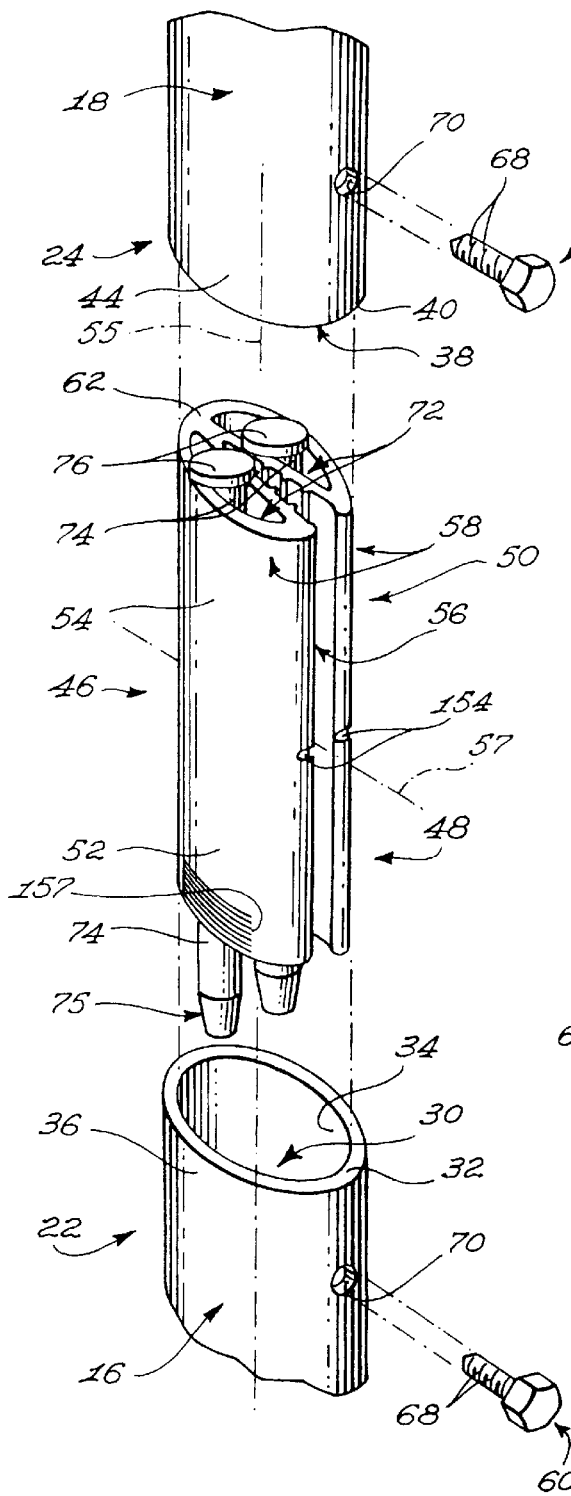
*Fig_3*
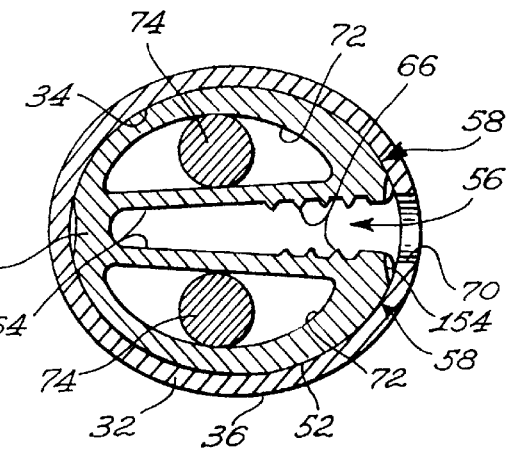
*Fig_4*
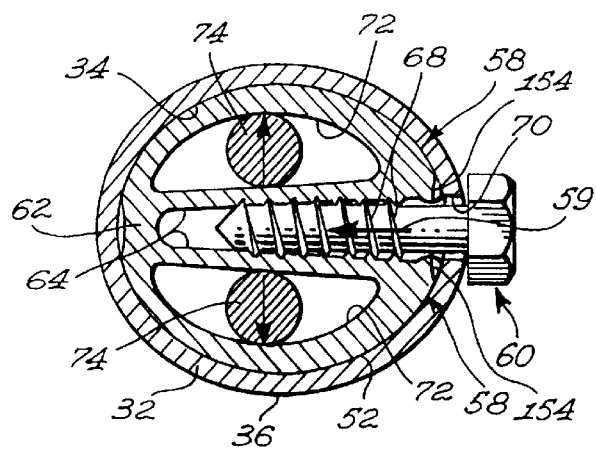
*Fig_5*

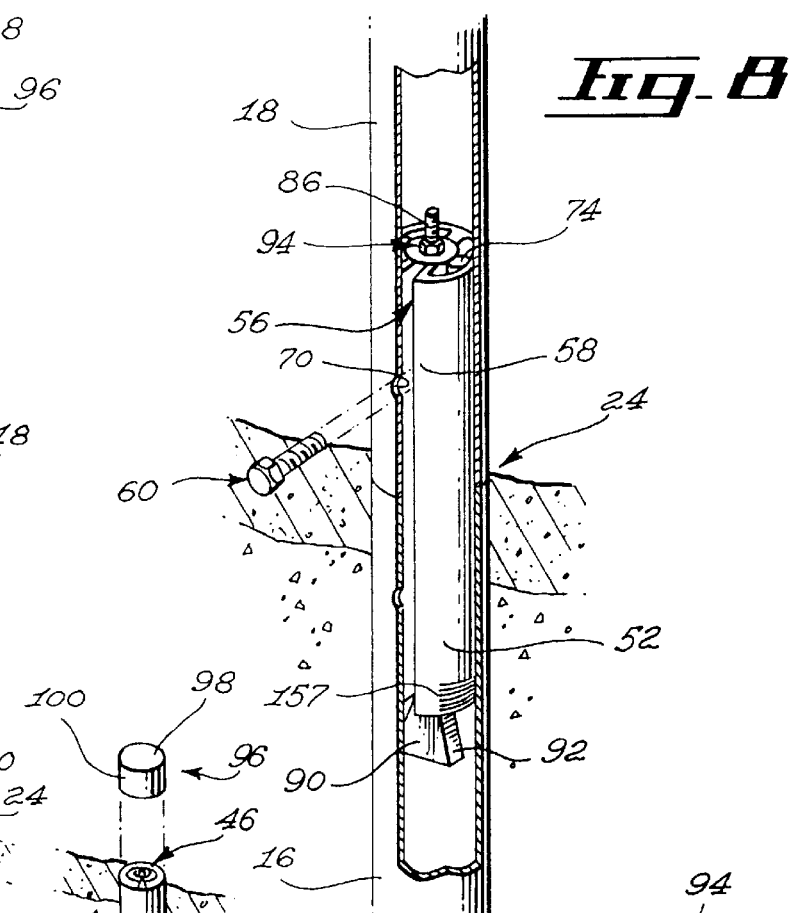

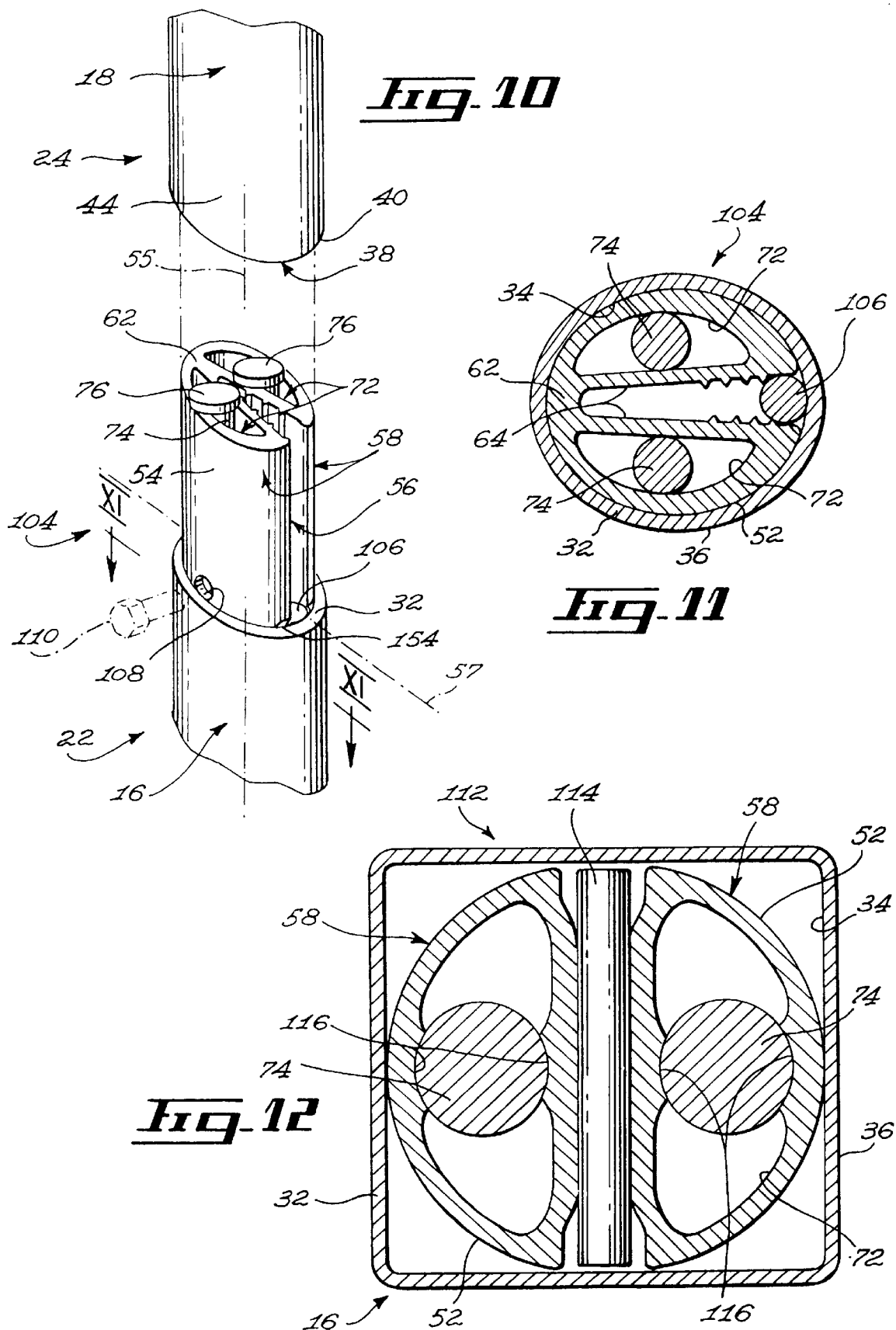

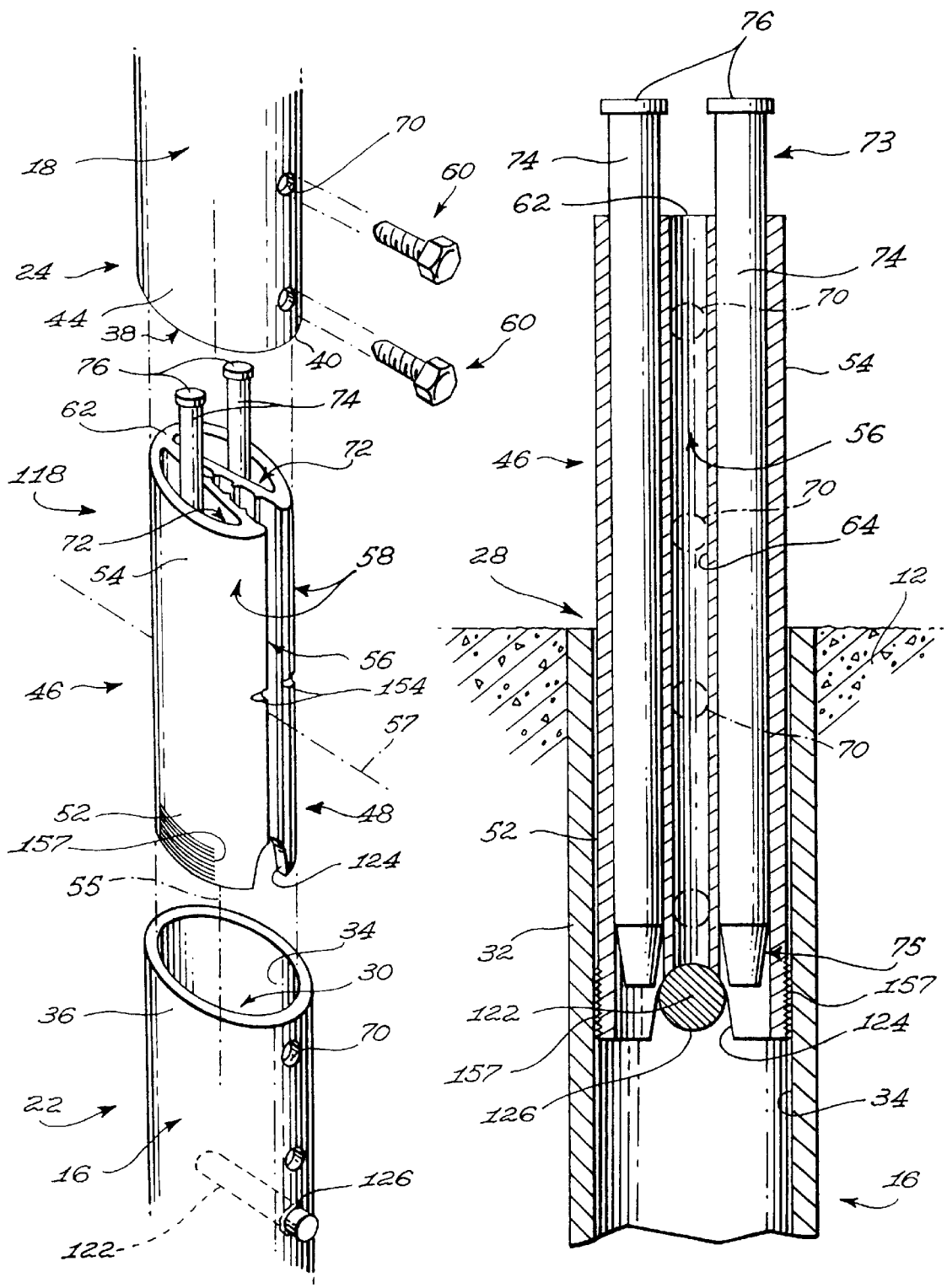

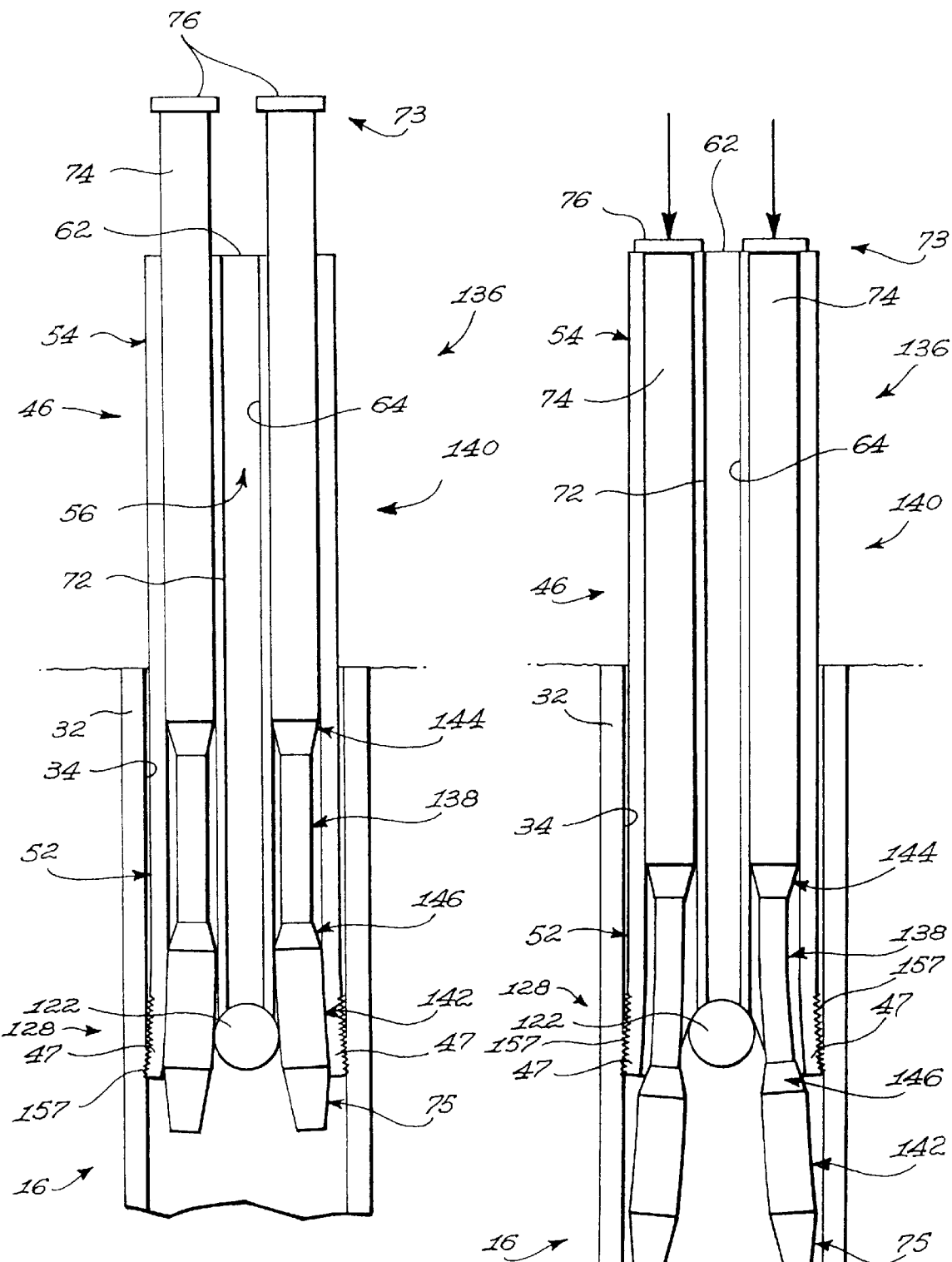

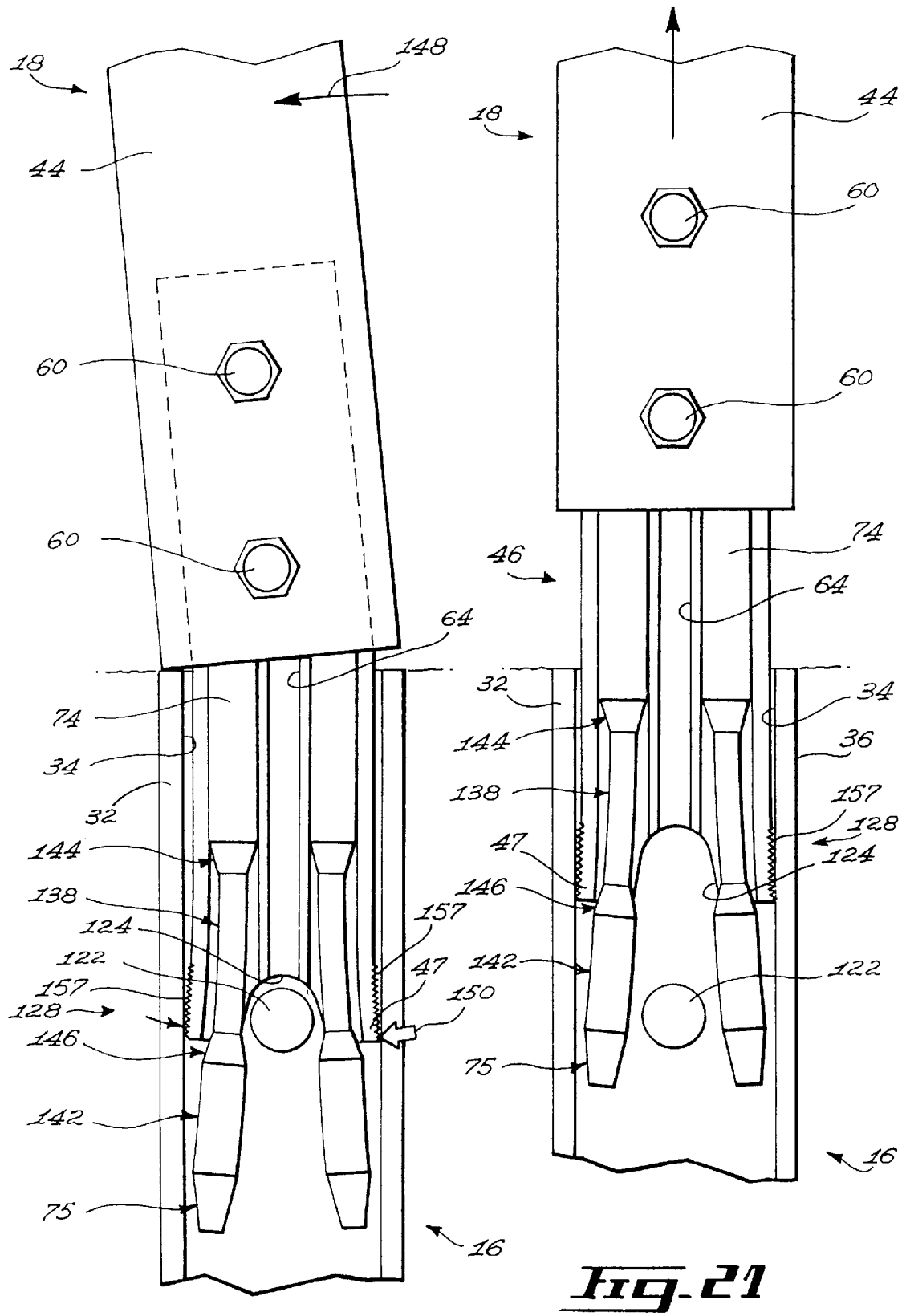

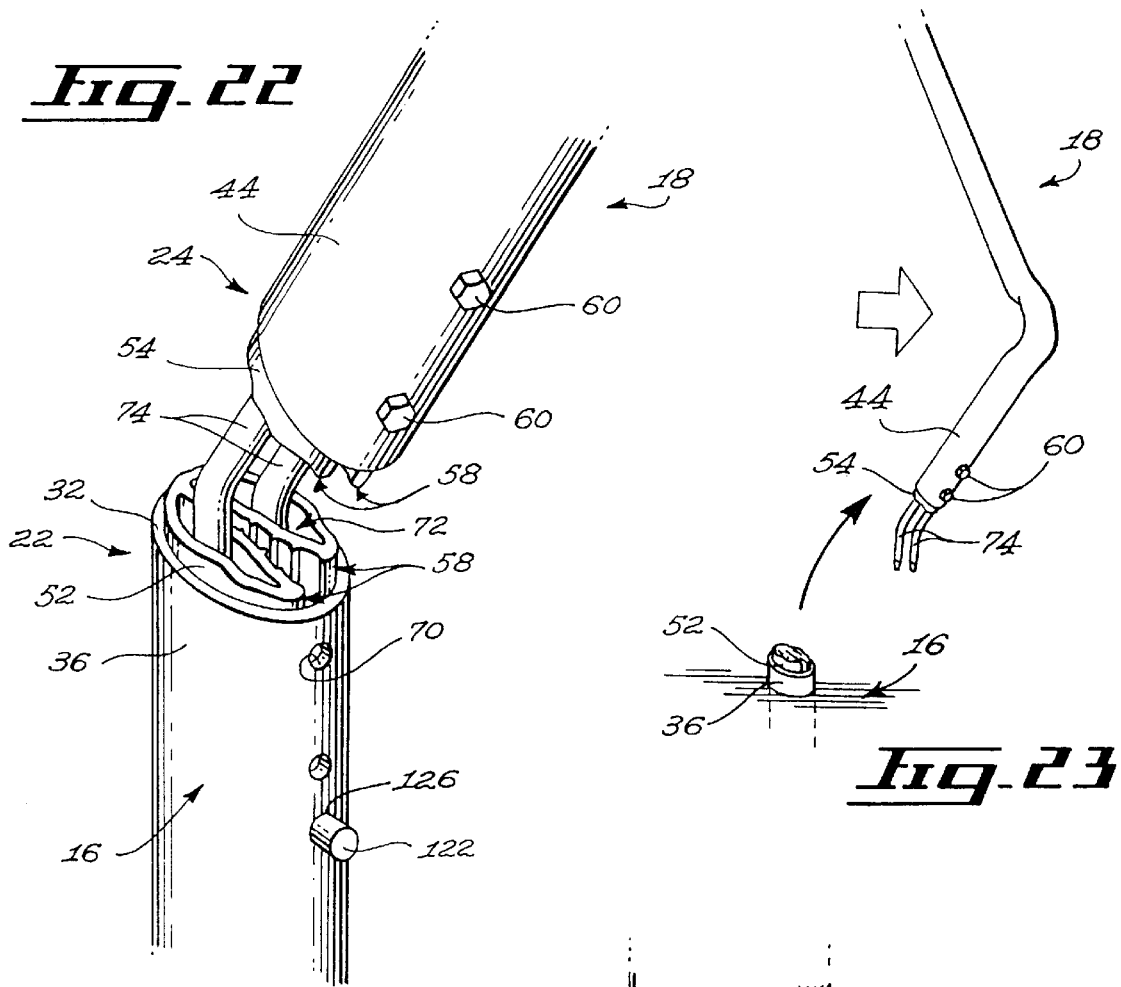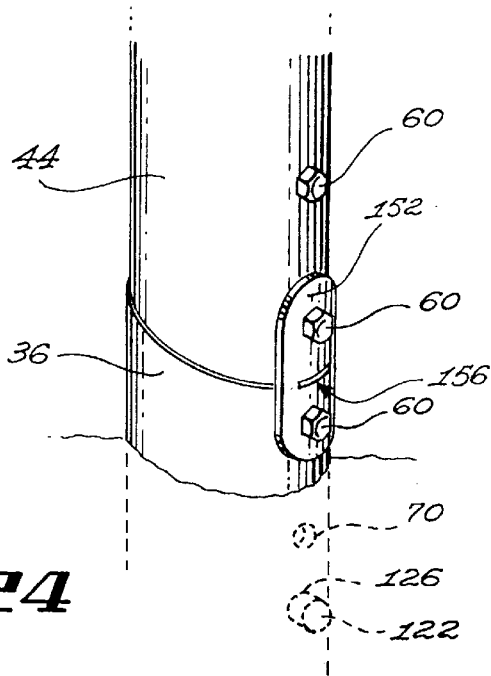

COLLAPSIBLE POST STRUCTURE

FIELD OF THE INVENTION

The present invention relates to the field of post structures and is particularly concerned with a post structure having a frangible region that allows the post to collapse when the latter is struck.

BACKGROUND OF THE INVENTION

Post structures are used extensively. For example, post structures are frequently used as signaling posts along roadways to either mark-out the roadway or support various types of signs. The conventional signaling post structure consists in a single elongated tubular member that is anchored in the ground.

One of the major drawbacks associated with conventional signaling post structures is that, in the event that the post structure is struck by a vehicle, it will often be bent or otherwise damaged by the impact and will thus need to be straightened or replaced. The straightening or replacement of conventional signaling post structures has proven to be tedious, time consuming and relatively expensive.

Another disadvantage associated with conventional signaling post structures is that in some instances the magnitude of the impact may cause the post structure to be sheared and projected, thus creating a potentially dangerous situation, sometimes over a relatively large area.

In order to circumvent the above mentioned disadvantages, various structures have been proposed. For example, U.S. Pat. No. 5,277,146 issued Nov. 12, 1994, naming Peter Stol as inventor teaches a flexible sign post for use along roadsides that allows a sign to be deflected when hit by a passing object. The sign post consists of a number of mounting brackets that are spaced apart and secured to a substantially rigid vertical sign post. Each mounting bracket has a mandrel over which an elastomeric sleeve is fitted. A number of substantially rigid braces are connected to the mounting brackets by the elastomeric sleeves. The sign can then be attached to the ends of the braces in a vertical position.

U.S. Pat. No. 5,160,111 issued Dec. 12, 1992, and naming Michael Lennard as inventor teaches a collapsible signaling post provided with a weakened section characterized by a helicoidal groove carved on the periphery of a tubular member mounted between an anchoring member and a rod member supporting a sign. The groove provides a weakened section adapted to split open along a portion thereof and upon bending caused by a lateral force exerted on the signaling post. The two end portions of the tubular member remain connected to each other by the unfolded spires formed between the helicoidal thread.

Although partly solving some of the above mentioned disadvantages, these structures present another drawback in that the replacement of one of these post structures once it has been hit by a vehicle requires a relatively lengthy, tedious and expensive operation.

Also, the prior art structures are not particularly well adapted to bend upon impact according to a predetermined pattern. The somewhat unpredictable behavior of these structures upon impact may lead to dangerous situations.

Furthermore, the structures disclosed in the above mentioned patents are relatively expensive to manufacture and install.

Also, these structures are not particularly well suited for situations wherein cyclic installation and removal are preferable or required. One example of such situation is the use of post structures to mark-out a cycling path in geographical regions wherein the sport is seasonal. In such a situation, it would be highly desirable to provide a post structure that can be readily removed and re-installed.

Accordingly, there exists need for an improved post structure that is adapted to bend upon impact according to a relatively predetermined pattern, while selectively maintaining the bent segments connected to each other. There also exists a need for an improved post structure that allows for quick and ergonomic installation and removal as well as easy and relatively inexpensive replacement of damaged parts.

SUMMARY OF THE INVENTION

It is an object of the present invention to provide an improved post structure.

In accordance with one aspect of the present invention, there is provided a post structure comprising a substantially elongated anchoring member, the anchoring member having an anchoring member first end and a longitudinally opposed anchoring member second end; the anchoring member having an anchoring member hollow section that extends longitudinally into the anchoring member second end, the anchoring member hollow section being peripherally delimited by an anchoring member peripheral wall, the anchoring member peripheral wall defining an anchoring member inner surface and an anchoring member outer surface; a substantially elongated supporting member, the supporting member having a supporting member first end and a longitudinally opposed supporting member second end; the supporting member having a supporting member hollow section that extends longitudinally into the supporting member fist end, the supporting member hollow section being peripherally delimited by a supporting member peripheral wall, the supporting member peripheral wall defining a supporting member inner surface and a supporting member outer surface; a connecting component, the connecting component having a connecting component first section and a connecting component second section, the connecting component first section and the connecting component second section being configured and sized so as to be respectively insertable into the anchoring member hollow section and the supporting member hollow section; the connecting component first section and the connecting component second section respectively defining a first friction surface and a second friction surface; the supporting member being frictionally attached to the anchoring component by the connecting component with the first friction surface frictionally contacting the anchoring member inner surface and the second friction surface frictionally contacting the supporting member inner surface; the anchoring member and the supporting member having a greater resistance to impact than the connecting component.

Preferably, the post structure further comprises a biasing means for selectively biasing at least a portion of the first friction surface and of the second friction surface respectively against the anchoring member inner surface and the supporting member inner surface.

Conveniently, the biasing means includes a longitudinally extending slot formed in the connecting component, the slot having a slot longitudinal axis and a slot transversal axis; the slot defining a pair of jaw members, the jaw members being at least partially separated by the slot; a jaw spreading means inserted in the slot between the jaw members for spreading the jaw members away from each other.

Preferably, a hollow jaw channel extends longitudinally through at least one of the jaw members and a retention nail extends longitudinally though the jaw channel; the retention nail including an elongated strip of relatively ductile material that defines a nail first end and a longitudinally opposed nail second.

Conveniently, the slot extends partially across the connecting component in the direction of the slot transversal axis so as to define an hinge section about which the jaw members are adapted to pivot.

Preferably, the slot defines a pair of opposed slot walls positioned on each side of the slot transversal axis that merge towards each other in a radial direction leading into the connecting component so that the slot defines a generally 'V'-shaped cross-sectional configuration.

In accordance with one embodiment of the invention, the jaw spreading means includes a wedging component, the wedging component having a generally elongated configuration defining a wedging component first end and a longitudinally opposed wedging component second end; an external wedging thread being formed on the wedging component adjacent the wedging component first end and a nut being threadably mounted on the wedging thread; the wedging component also defining a wedge abutment segment adjacent the wedging component second end, the wedge abutment segment having an outwardly bevelled configuration in a direction leading away from the wedging component first end; the wedging component being longitudinally inserted in the slot with the edge abutment segment abutting against a longitudinal end of the connecting component first section and the nut contacting a longitudinal end of the connecting component second section; whereby, the nut is adapted to be used for varying the depth of insertion of the wedge abutment segment in the slot and the depth of insertion is adapted to influence the spacing between the jaw members.

Preferably, the slot is provided with a slot thread extending integrally from the slot walls and the jaw spreading means includes a bolt that is threadably inserted into the slot in the direction of the slot transversal axis so as to bias the jaw members away from each other.

In accordance with one embodiment of the invention, the biasing means includes a diverging component that extends transversally through the anchoring component and that is configured and sized so as to force a diverging portion part of the retention nails to diverge outwardly; whereby the diverging portion is adapted to cause a flare section part of the connecting component to flare outwardly so that a portion of the first friction surface is biased against the anchoring member inner surface.

Preferably, the diverging component includes a diverging rod that is nested in a transversally extending connecting component recess formed in the connecting component, the connecting component recess extending between the jaw members in a direction substantially parallel to the slot transversal axis, the connecting component recess being sized so as to intercept the jaw channels.

Conveniently, the post structure further comprises a nail recess section formed on the retention nail wherein the outer peripheral surface of the retention nail is inwardly recessed, the nail recess section defining a nail proximal section positioned between the nail recess section and the nail first end; the nail recess section also defining a nail distal section positioned between the nail recess section and the nail second end.

Preferably, the post structure further a first transitional area and a second transitional area both formed on the retention nail between the nail recess section and respectively the nail proximal section and the nail distal section, the first transitional area and the second transitional area having a generally tapered configuration.

Conveniently, the connecting component has a priming notch formed thereon for creating a weakness area about which the connecting component will deform upon lateral impact.

Preferably, a textured marking is formed on the first friction surface for increasing the frictional force between a portion of the first friction surface and a corresponding portion of the anchoring member inner surface.

Conveniently, a fuse plate is mounted mounted on the exterior surface of both the anchoring member and the supporting member so as to override the junction between the anchoring member second longitudinal end and the supporting member first longitudinal end the fuse plate being made of a material that is more susceptible to deform upon impact then the connecting component.

Conveniently, a fuse plate notch is formed on the fuse plate for creating a preferential weakness area about which the fuse plate is adapted to initially deform upon impact.

Preferably, the anchoring member, the supporting member and the connecting component all have a generally oval cross-sectional configuration.

Advantages of the present invention include that the post structure has a weakened section adapted to be bent according to a relatively predetermined pattern upon impact by a vehicle and that in the event that the post is sheared due to the magnitude of a particular impact, the sheared portions of the post will selectively remain connected to each other so as to prevent sections of the post from being projected in the air.

Another advantage of the present invention resides in the fact that the sections of the post damaged by an impact may be easily and readily replaced.

A further advantage of at least one embodiment of the present invention resides in the fact that the section of the post structure that protrudes from the ground surface may be easily removed and replaced and that when the section of the post structure that protrudes from the ground is removed, the ground surface does not present any protruding section.

A still further advantage of the present invention is that the post structure can be manufactured using relatively inexpensive and conventional forms of manufacturing so as to provide a post structure that is economical, long lasting and relatively trouble free in operation.

BRIEF DESCRIPTION OF THE DRAWINGS

An embodiment of the present invention will now be described, by way of example, in reference to the following drawings in which:

FIG. 1: in a perspective view, illustrates a signaling post structure in accordance with a first embodiment of the present invention anchored into a ground surface and supporting a sign;

FIG. 2: in a longitudinal cross-sectional view taken along arrows II—II of FIG. 1, illustrates the connection between an anchoring component, a connecting component and a supporting component, all part of a signaling post structure in accordance with a first embodiment of the present invention;

FIG. 3: in a partial exploded view with sections taken out, illustrates a connecting component part of the signaling post structure of FIG. 1;

FIG. 4: in a transversal cross-sectional view, illustrates a connecting component part of the signaling post structure of FIG. 1 in an unlocked configuration;

FIG. 5: in a transversal cross-sectional view, illustrates a connecting component part of the signaling post structure of FIG. 1 in a locked configuration;

FIG. 6: in a perspective view with sections taken-out, illustrates a signaling post structure in accordance with a second embodiment of the present invention anchored into a ground surface;

FIG. 7: in a perspective view, illustrates a signaling post structure in accordance with a second embodiment of the present invention anchored into a ground surface with its supporting component removed and its connecting component in a retracted configuration;

FIG. 8: in perspective view with sections taken-out, illustrates details part of a signaling post structure in accordance with a second embodiment of the present invention anchored into a ground surface;

FIG. 9: in an elevational view, illustrates a wedging component part of a signaling post structure in accordance with a second embodiment of the present invention;

FIG. 10: in a perspective view with sections taken-out, illustrates details part of a signaling post structure in accordance with a third embodiment of the present invention;

FIG. 11: in a cross-sectional view, illustrates details part of a signaling post structure in accordance with a third embodiment of the present invention;

FIG. 12: in a perspective view with sections taken-out, illustrates details part of a signaling post structure in accordance with a fourth embodiment of the present invention;

FIG. 14: in a partial exploded view with sections taken out, illustrates a connecting component in accordance with a fifth embodiment of the present invention;

FIG. 15: in a longitudinal cross-sectional view, illustrates the connection between an anchoring component, a connecting component and a supporting component part of a signaling post structure in accordance with a fifth embodiment of the present invention, the connecting component being shown with its retention nails about to be inserted in their corresponding jaw channels;

FIG. 18: in a longitudinal cross-sectional view, illustrates the connection between an anchoring component, a connecting component and a supporting component part of a signaling post structure in accordance with a sixth embodiment of the present invention, the connecting component being shown with its retention nails in their diverged configuration;

FIG. 19: in a longitudinal cross-sectional view, illustrates the connection between an anchoring component, a connect-ing component and a supporting component part of a signaling post structure in accordance with a sixth embodiment of the present invention, the connecting component being shown with its retention nails in their fully inserted configuration;

FIG. 20: a longitudinal cross-sectional view, illustrates the connection between an anchoring component, a connecting component and a supporting component part of a signaling post structure in accordance with a sixth embodiment of the present invention, the connecting component being shown as it is tilted sidewardly;

FIG. 21: in a longitudinal cross-sectional view, illustrates the connection between an anchoring component, a connecting component and a supporting component part of a signaling post structure in accordance with a sixth embodiment of the present invention, the connecting component being shown as it is pulled out of the anchoring component;

FIG. 22: in a perspective view with sections taken-out, illustrates details part of a signaling post structure in accordance with an embodiment of the present invention after is has been impacted, the supporting structure remaining attached to the anchoring component by the retention nails;

FIG. 23: in a perspective view with sections taken-out, illustrates details part of a signaling post structure in accordance with an embodiment of the present invention after is has been impacted, the supporting structure having been ejected away from the anchoring component;

FIG. 24: in a perspective view with sections taken-out, illustrates details part of a signaling post structure in accordance with an embodiment of the present invention, the post structure being shown with an optional trigger plate mounted thereon.

Figure 13:
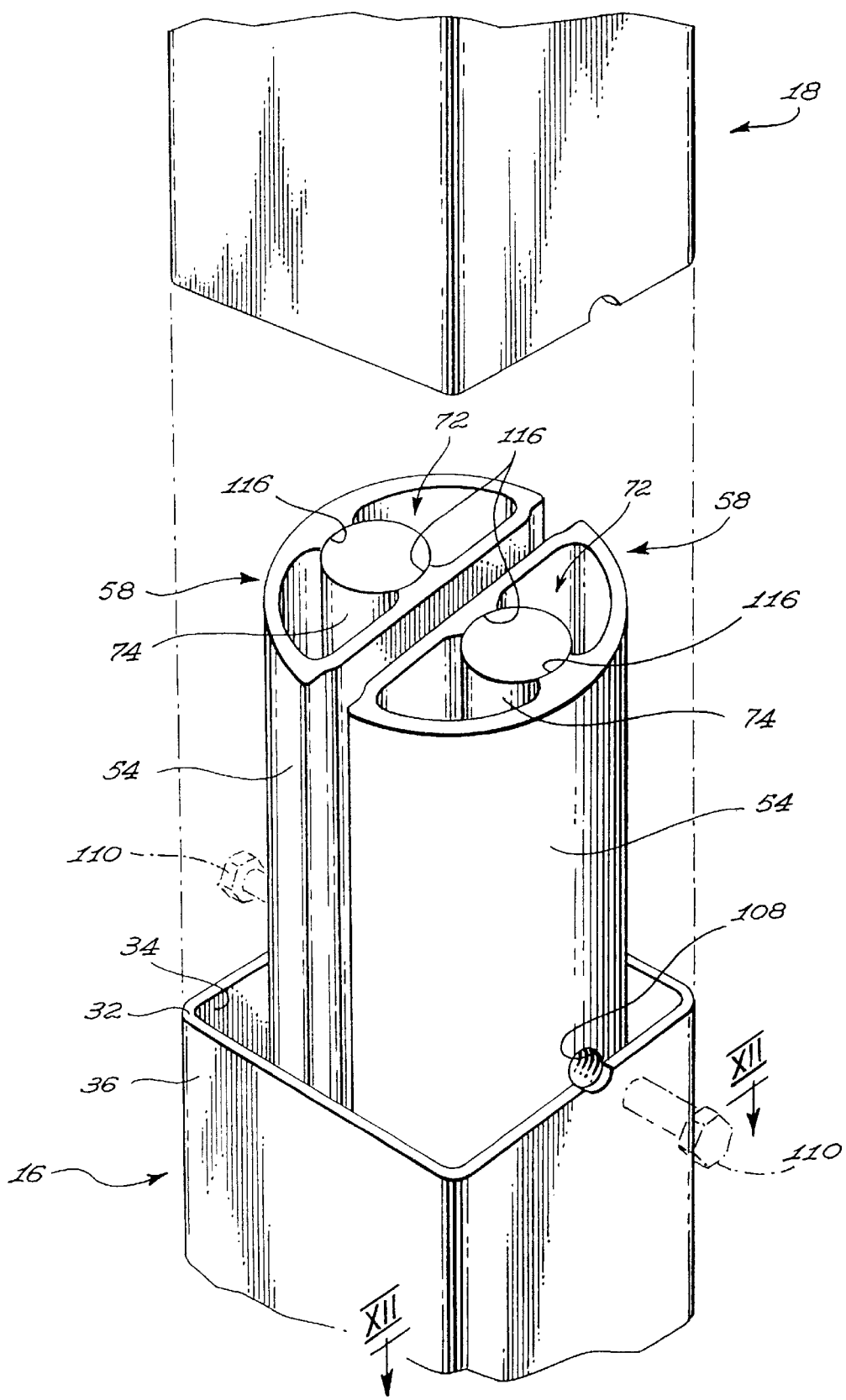
FIG. 13: in a partial exploded view, illustrates details part of a signaling post structure in accordance with a fourth embodiment of the present invention.

Similar references are used in different views to denote similar components.

DETAILED DESCRIPTION

Referring to FIG. 1, there is shown a post structure 10 in accordance with a first embodiment of the present invention. The post structure 10 is shown anchored into a volume of suitable material herein referred to as the ground 12. The post structure 10 is shown supporting a sign 14. It should be understood that even though the post structure 10 is herein illustrated and described as being a signaling post supporting a sign, it could be used without the sign 14 and in any suitable context without departing from the scope of the present invention.

The post structure 10 includes a tubular anchoring member 16 for anchoring the post structure 10 into the ground 12 and a tubular supporting member 18 for protruding from the ground 12 and optionally supporting the sign 14. Both the anchoring member 16 and the supporting member 18 have a substantially elongated general configuration.

The anchoring member 16 has an anchoring member first longitudinal end 20 and an anchoring member second longitudinal end 22, while the supporting member 18 has a supporting member first longitudinal end 24 and a supporting member second longitudinal end 26. The supporting member first longitudinal end 24 is adapted to be connected in end-to-end relationship with the anchoring member second longitudinal end 22 by a connecting structure generally designated by the reference numeral 28.

As illustrated more specifically in FIGS. 2 and 3, the anchoring member 16 has an anchoring member hollow section 30 extending longitudinally into the anchoring member second longitudinal end 22. The anchoring member hollow section 30 is peripherally delimited by an anchoring member peripheral wall 32. The anchoring member peripheral wall 32 defines an anchoring member inner surface 34 and an anchoring member outer surface 36.

Similarly, the supporting member 18 has a supporting member hollow section 38 extending longitudinally into the supporting member first longitudinal end 24. The supporting member hollow section 38 is peripherally delimited by a supporting member peripheral wall 40. The supporting member peripheral wall 40 defines a supporting member inner surface 42 and a supporting member outer surface 44.

The anchoring member hollow section 30 and the supporting member hollow section 38 may respectively extend along the entire length of the anchoring member 16 and of the supporting member 18. Alternatively, the anchoring member hollow section 30 and the supporting member hollow section 38 may be reduced to a region located respectively adjacent the anchoring member second longitudinal end 22 and the supporting member first longitudinal end 24. However, the anchoring member hollow section 30 and the supporting member hollow section 38 must both be configured and sized so as to accommodate a connecting component 46 part of the connecting structure 28, as will be hereinafter disclosed.

Typically, when the anchoring member hollow section 30 and the supporting member hollow section 38 only extend over a predetermined distance, the anchoring member 16 and the supporting member 18 are preferably made of a metallic tubing that is partially filled with a reinforcing material such as concrete. The concrete material is indicated in FIG. 2 by the reference character C.

The anchoring member 16 is typically filled from the anchoring member first longitudinal end 20 to the anchoring member hollow section 30, while the supporting member 18 is filled from the supporting member second longitudinal end 26 to the supporting member hollow section 38. It should be understood that both the anchoring member 16 and the supporting member 18 could be completely hollow, be partially filled with suitable materials other then concrete or be made integrally out of a single material without departing from the scope of the present invention as long as they respectively define an anchoring member hollow section 30 and a supporting member hollow section 38.

The connecting component 46 preferably has a generally elongated configuration. The connecting component 46 defines a connecting component first section 48 and a connecting component second section 50. The connecting component first section 48 and the connecting component second section 50 are configured and sized to be respectively insertable into the anchoring member hollow section 30 and the supporting member hollow section 38.

The connecting component first section 48 defines a first friction surface 52 that is adapted to be put in frictional contact with the anchoring member inner surface 34. Similarly, the connecting component second section 50 defines a second friction surface 54 that is adapted to be put in frictional contact with the supporting member inner surface 42.

The connecting device 22 preferably further includes a biasing means for biasing at least a portion of the first friction surface 52 and of the second friction surface 54 respectively against the anchoring member inner surface 34 and the supporting member inner surface 42.

In the first embodiment illustrated in FIGS. 1 through 5, the biasing means includes a longitudinally extending slot 56 formed in the connecting component 46 that defines a pair of jaw members 58. The slot 56 defines a slot longitudinal axis 55 and a slot transversal axis 57. The biasing means 46 also includes at least one and preferably two jaw spreading means that are adapted to be inserted into the slot 56 for biasing the jaw members 58 away from each other against the anchoring member inner surface 34 and the supporting member inner surface 42.

The slot 56 preferably extends relatively deeply across the connecting component 46 in the direction of the slot transversal axis 57 so as to define an hinge section 62 about which the jaw members 58 will pivot. The slot 56 further defines a pair of opposed slot walls 64 positioned on each side of the slot transversal axis 57 that preferably merge towards one another in a direction leading radially into the connecting component 46 so as to define a slot 56 having a generally "V"-shaped cross-sectional configuration.

The jaw spreading means is preferably configured so as to be inserted radially into the slot 56 as indicated by arrow 59 in FIG. 5. Preferably the jaw spreading means is a bolt-type component 60. The slot 56 is preferably provided with a set of slot threads 66 extending integrally from the slot walls 64. As illustrated in FIG. 5, the slot threads 66 are adapted to cooperate with bolt threads 68 part of the bolt-type component 60 for allowing the latter to be threadably inserted into the slot 56.

The anchoring member 16 and the supporting member 18 preferably both have a bolt aperture 70 extending transversely therethrough respectively adjacent the anchoring member second longitudinal end 22 and the supporting member first longitudinal end 24. The bolt apertures 70 are configured and sized to allow through insertion of the bolt-type components 60.

Each jaw member 58 preferably defines a corresponding hollow jaw channel 72 extending longitudinally therethrough. A retention nail 74 preferably extends through each jaw channel 72. Each retention nail 74 typically consists in an elongated strip defining a nail first end 73 and a nail second end 75. The nail first end 73 is preferably provided with a nail head 76 extending integrally therefrom. Each retention nail 74 is preferably made of a relatively ductile metallic alloy such as steel. The nail head 76 is adapted to abuttingly contact the peripheral edges of the jaw channel 72 into which it is inserted, thus preventing the gravitational force from sliding the retention nail 74 out of the jaw channel 72.

The jaw channels 72 are thus adapted to minimize the weight and the production cost of the jaw members and to optionally receive corresponding retention nails 74. As will be hereinafter disclosed, the retention nails 74 are adapted to selectively prevent the supporting member 18 from being projected away from the anchoring member 16 in the event that the connecting component 46 is sheared due to an impact on the post structure 10.

Preferably, the anchoring member 16 and the supporting member 18 are made of galvanized steel coated by a layer of polymeric resin such as a polyamide resin. Typically, the connecting component 46 is made of an integral piece of aluminum. It should be understood that the anchoring member 16, the supporting member 18 and the connecting component 46 could be made of any suitable material without departing from the scope of the present invention as long as the combination of the material and configuration renders the connecting component 46 more susceptible to deform upon lateral impact then the anchoring member 16 and the supporting member 18.

Optionally, the connecting component 46 has a priming notch 154 formed thereon for creating a weakness area about which the connecting component 46 will preferably bend or shear upon lateral impact. The priming notch 154 preferably extends across both jaw members 58 opposite the hinge section 62. The priming notch 154 is preferably located substantially midway relatively to the longitudinal axis 55.

Optionally, the connecting component 46 has a textured marking 157 formed on the first friction surface 52 for increasing the frictional force between a portion of the first friction surface 52 and a corresponding portion of the anchoring member inner surface 42. The textured marking 157 preferably takes the form of friction ribs extending integrally from the first friction surface 52.

As mentioned previously, the anchoring member 16 is adapted to be connected in end-to-end relationship relatively to the supporting member 18 by the connecting component 46. To connect the anchoring member 16 to the supporting member 18, the connecting component first section 48 and the connecting component second section 50, in their relaxed configuration illustrated in FIGS. 3 and 4, are first slidably inserted respectively into the anchoring member hollow section 30 and the supporting member hollow section 38. The bolt-type components 60 are then slidably inserted into each bolt aperture 70 and threadably inserted into the slot 56.

As the bolt-like components 60 are threadaly inserted into the slot 56, they widen the slot 56 thus biasing the jaw members 58 away from each other towards a locking configuration illustrated in FIG. 5. Since, in the preferred embodiment the slot 56 has a substantially "V"-shaped cross-sectional configuration, a deeper penetration of the bolt-type component 60 in the slot 56 will cause a greater movement of the jaw members 58 away from each other.

The relative movement of the jaw members 58 away from each other, in turn, creates a frictional force between the first friction surface 52 and the anchoring member inner surface 34. The relative movement of the jaw members 58 away from each other also creates a frictional force between the second friction surface 54 and the supporting member inner surface 42. The frictional forces being distributed over a relatively large area, they provide for a strong and reliable connection.

The connecting component jaw members 34 are thus adapted to pivot relatively to one another about the hinge section 62 between a relaxed configuration illustrated in FIGS. 3 and 4 and a locking configuration illustrated in FIG. 5. In the relaxed configuration, the slot walls 64 and the jaw members 58 are relatively close to each other thus facilitating not only the insertion of the connecting component first section 48 and the connecting component second section 50 respectively in the anchoring member hollow section 30 and the supporting member hollow section 38 but also their respective retraction during disassembly.

When the jaw members 58 are hingely connected by an hinge section 62 as is the case with the first embodiment of the invention, the resilient nature of the material from which the hinge section 62 is made allows the latter to bias the jaw members 58 towards their relaxed configuration as the bolt-type component 60 is retracted from the slot 56.

As illustrated in FIG. 1, the anchoring member 16 is adapted to be inserted into the ground 12 with the anchoring member second longitudinal end 22 preferably positioned at, or slightly above, the ground 12.

The anchoring member 16 being solidly anchored into the ground 12, the post structure 10 will have a tendency to bend about its most frangible section. Since the anchoring member 16 and the supporting member 18 are both made of a stronger material than the connecting component 46, and since the anchoring member 16 and the supporting member 18 both have a greater diameter than the connecting component 28, a lateral impact on the post structure 10 will cause the latter to bend or shear about the connecting component 46 at a location positioned adjacent the junction between the anchoring member second longitudinal end 22 and the supporting member first longitudinal end 24. When the connecting component 46 has a priming notch 154 formed thereon, it will have a tendency to bend or shear about the latter upon lateral impact.

Depending on the magnitude of the impact, the connecting component 46 may either bent while remaining integral, be sheared and remain connected by the retention nails 74 as illustrated in FIG. 22 or be sheared and allow the supporting member 18 to be projected away from the anchoring member 16, as illustrated in FIG. 23. With relatively low and intermediate impact force magnitudes, it is desirable that the supporting member 18 remains attached to the anchoring member 16.

Thus, the connecting component 46 is configured and sized so that impact forces of relatively low magnitude will merely cause the connecting component 46 to bend while it remains integral. In the event that an impact force of intermediate magnitude causes the connecting component 46 to be sheared, the anchoring member 16 is prevented from being projected away from the supporting member 18 by the retention nails 74. Indeed, since the retention nails 74 are not subjected directly to the impacting force and since they are preferably made of a relatively ductile material, they will have a tendency to bend while remaining inside their respective jaw channels 72, thus forming a hook-shaped configuration for keeping the anchoring member 16 attached to the supporting member 18, as illustrated in FIG. 22.

With relatively high impact force magnitudes, it is desirable that the supporting member 18 be projected away from the anchoring member 16. Thus, in the event that an impact force of high magnitude causes the connecting component 46 to be sheared, the retention nails 74 are adapted to slide out of the jaw channel 72, as illustrated in FIG. 23. Customization of the configuration and size of the components allows for predetermined reactions at predetermined impact magnitudes.

The connecting component 46 having a substantially constant cross-sectional configuration, it is particularly well adapted to be manufactured through a relatively inexpensive manufacturing process such as extrusion. Typically, the anchoring member 16, the supporting member 18 and the connecting component 46 all have a generally oval cross-sectional peripheral configuration. The oval configuration is adapted to limit the rotation of the post structure 10 about its longitudinal axis. This characteristic can prove to be particularly useful when high winds or wind turbulence caused by vehicles passing close to the sign 14 create a rotational torque on the post structure 10.

The non-circular and preferably oval cross-sectional configuration also allows for the connecting component 46 to be frictionnaly assembled to the anchoring component 16 and the supporting component 18 by a mere relative rotation of the components about their respective longitudinal axis. Indeed, by rotating the connecting component relatively to the anchoring component 16 and the supporting component 18 it is possible to create a frictional force between the first friction surface 52 and the anchoring member inner surface 34 and to similarly create a frictional force between the second friction surface 54 and the supporting member inner surface 42. The relative rotation between the components may be used for temporarily keeping the components in predetermined longitudinal positioning relatively to each other during assembly.

FIGS. 6 through 9 illustrate a post structure 78 in accordance with a second embodiment of the invention. The post structure 78 is substantially identical to the post structure 10 and thus, similar reference numerals will be used to designate similar components.

One of the main differences between the post structures 10 and 78 resides in the structure of the biasing means used for biasing at least a portion of the first friction surface 52 against the anchoring member inner surface 34. Instead of including a component that is inserted radially into the slot 56, the biasing means of the post structure 78 includes a wedging component 80 that is inserted longitudinally in the slot 56.

As illustrated more specifically in FIG. 9, the wedging component 80 has a substantially elongated general configuration. The wedging component 80 has a wedging component first end 82 and a wedging component second end 84. An external wedging component thread 86 is formed on the wedging component 80 adjacent the wedging component first end 82.

The wedging component 80 defines a wedge abutment segment 88 adjacent the wedging component second end 84. The wegde abutment segment 88 has an outwardly bevelled configuration in a direction leading away from the wedging component first end 82. Typically, the abutment segment 88 has a pair of abutment segment parallel surfaces 90 and a pair of abutment segment bevelled surfaces 92.

As illustrated in FIG. 8, the wedging component 80 is configured and sized so as to be insertable longitudinally through the slot 56 with the edge abutment segment 88 partly inserted into the slot 56 and abutting against a longitudinal end of the connecting component first section 48. A conventional nut and washer combination 94 is adapted to be used for longitudinally tensioning the wedging component 80 and thus for varying the depth of insertion of the wedge abutment segment 88 in the slot 56.

During assembly, the anchoring component 46 in its relaxed configuration is first inserted into the anchoring component 16 so that the connecting component first section 48 is put in register with the anchoring member inner surface 34. The connecting component 46 is oriented so that the wedging component thread 86 is positioned above the wedge abutment segment 88.

The nut 94 is then rotated so as to longitudinally longitudinally tension the wedging component 80 and thus increase the penetration of the wedge abutment segment 88 in the slot 56. Since the wedge abutment segment 88 is bevelled, as it penetrates longitudinally in the slot 56, it forces jaw members 58 to pivot away from each other, thus biasing the latter towards their locking configuration. As illustrated in FIGS. 6 and 8, once the connecting component 46 is frictionally secured to the anchoring component 16, the supporting component 18 is secured to the connecting component 46 in a manner similar to that described previously for the post structure 10.

The post structure 78 is particularly well suited for applications wherein the anchoring member 16 is fully inserted into the ground 12, thus rendering the bolt-like component 60 inserted though the anchoring member 16 difficult to access. As illustrated in FIG. 7, when the supporting component 18 is removed, the connecting component 46 may be conveniently stored by lowered it into the anchoring component 16 and releasably locking it inside the anchoring component 16 using the wedging component 80.

A substantially disk-shaped cap 96 may optionally be provided for sealing-off the anchoring member second longitudinal end 22 from dust rain, snow or the like when the supporting member 18 is removed. The cap 96 typically includes a substantially disk-shaped cap wall 98 having a peripheral flange 100 depending therefrom. The cap 96 is configured and sized to be fittingly insertable over the anchoring member second longitudinal end 22. Similarly, the supporting member second longitudinal end 26 may also be sealed-off by a cap 96, as illustrated in FIG. 6.

In situations wherein the post structure 78 is used to mark-out a path, it may be desirable to make the supporting member 18 more visible by fixing a set of reflective strips adjacent its supporting member second longitudinal end 26. The reflective strips 54 typically consist in adhesive strips of flexible material coated with a fluorescent or luminescent substance.

FIGS. 10 and 11 illustrate a post structure 104 in accordance with a third embodiment of the present invention. The post structure 104 is substantially identical to the post structure 78 and thus, similar reference numerals will be used to designate similar components.

One of the main differences between the post structures 78 and 104 resides in the structure of the biasing means used for biasing at least a portion of the first friction surface 52 against the anchoring member inner surface 34 and in the corresponding method used for spreading the jaw member 58 apart. Instead of including a biasing component such as the wedging component 80, the biasing means includes a biasing rod 106 having a substantially constant cross-sectional configuration that is pressured longitudinally in the slot 56. The external diameter of the biasing rod 106 is sized so as to be fittingly inserted in the slot 56 when the first friction surface 52 frictionnaly abuts against the anchoring member inner surface 34.

Furthermore, instead of first inserting the wedging component 80 through the slot 56 with its abutment segment 88 partly inserted into the slot and then thightening the nut 94 to vary the depth of insertion, the biasing rod 106 is forcefully pressured longitudinally into the slot 56 using a one step procedure. Typically, the biasing rod 106 is hammered into the slot 56 until it is fully inserted in the section of the slot 56 nested in the anchoring component 14.

A supporting means for temporarily supporting the anchoring component 44 while the biasing rod 106 is pressured longitudinally into the slot 56 may optionally be provided. Typically, the supporting means includes at least one and preferably two supporting apertures 108 that extend through the connecting component 46. A supporting aperture 108 is preferably provided in each jaw member 58 in diametrically opposed locations. The supporting apertures 108 preferably extend in a direction substantially perpendicular to the slot 46.

Each supporting aperture 108 is adapted to releasably receive a corresponding supporting pin 110. The supporting pins 110, in turn, are adapted to abuttingly contact the peripheral edge of the anchoring member second longitudinal end 22 for temporarily supporting the connecting component 46 while the biasing rod 106 is being hammered into the slot 56.

FIGS. 12 and 13 illustrate a post structure 112 in accordance with a fourth embodiment of the present invention. The post structure 112 is substantially identical to the post structure 104 and thus, similar reference numerals will be used to designate similar components.

One of the main differences between the post structures 104 and 112 resides in that the jaw members 58 are not hingely connected by an hinge section 62. It should be understood that even though FIGS. 1 through 24 illustrate various embodiments of the invention wherein the connecting component 46 only includes two jaw members and wherein the jaw members have relatively similar cross-sectional configuration, the connecting component 46 could include any number of jaw members having various types of cross-sectional configurations, with or without connections therebetween while still remaining within the scope of the present invention.

Another difference between the post structures 104 and 112 resides in the shape of the jaw spreading means. The jaw spreading means of the post structure 112 includes a biasing block 114. Similarly to the biasing rod 106, the biasing block 114 has a substantially constant cross-sectional configuration. Also the biasing block 114 is configured and sized so that as to be fittingly inserted in the slot 56 when the first friction surface 52 frictionnaly abuts against the anchoring member inner surface 34. It should be understood that the jaw spreading means could vary in configuration without departing from the scope of the present invention as long as it can be used to bias at least a portion of some of the jaw members 58 against the anchoring member inner surface 34 and the supporting member inner surface 42.

A further difference between the post structures 104 and 112 resides in the cross-sectional configuration of the anchoring component 16 and of the supporting member 18. The anchoring component 16 and the supporting member 18 of the post structure 112 have a generally square cross-sectional configuration. It should be understood that although FIGS. 1 through 24 only illustrate anchoring components 16 and supporting members 18 having oval and square cross-sectional configurations, the anchoring component 16 and the supporting member 18 could have any suitable cross-sectional and longitudinal configuration without departing from the scope of the present invention.

A still further difference between the post structures 104 and 112 resides in the configuration of the peripheral edge of the jaw channels 72 that defines a nail guiding sleeve for guiding the longitudinal movement of the retention nails 74. The nail guiding sleeve preferably includes a pair of opposed protuberances 116. The protuberances 116 preferably have a generally concave surface that is configured and sized to abuttingly contact a portion of the outer peripheral surface of the retention nails 74. It should be understood that the peripheral edge of the jaw channels could have any cross-sectional configuration without departing from the scope of the present invention.

FIGS. 14 through 17 illustrate a post structure 118 in accordance with a fifth embodiment of the present invention. The post structure 118 is substantially identical to the post structure 78 and thus, similar reference numerals will be used to designate similar components.

One of the main differences between the post structures 78 and 118 resides in the structure of the biasing means used for biasing at least a portion of the first friction surface 52 against the anchoring member inner surface 34 and in the corresponding method used for spreading the jaw member 58 apart. Instead of including a biasing component such as the wedging component 80, the biasing means includes a diverging component that partially obstructs the through passage of the retention nails 74 in the jaw channels 72. As illustrated more specifically in FIG. 16, the diverging component is configured and sized so as to force a diverging portion 128 part of the retention nails 74 to diverge outwardly as the retention nails 74 are slidably forced longitudinally through the jaw channels 72.

As illustrated more specifically in FIGS. 14 and 15, the diverging component preferably includes a diverging rod 122 that is adapted to be nested in a transversally extending connecting component recess 124 formed in the connecting component 46. The connecting component recess 124 is preferably oriented so as to extend between both jaw channels 72 in a direction substantially parallel to the slot transversal axis 57. Preferably, the connecting component recess 124 is sized so as to transversally intercept both jaw channels 72.

In order to stabilize the diverging rod 122, the latter also preferably extends through a pair of diametrically opposed diverging rod apertures 126 formed in the anchoring member 16. To facilitate the sliding of the nail second end 75 over the diverging rod, the nail second end 75 is preferably given a generally tapered configuration in a direction leading away from the nail first end 73.

In use, as illustrated in FIG. 14, the diverging rod 122 is first secured to the anchoring component 16 by inserting it through the diverging rod apertures 126. As illustrated in FIG. 15, the connecting component 46, in its relaxed configuration is then partially inserted in the anchoring component 16 with the connecting component recess 124 overriding the diverging rod 122.

Figure 16:
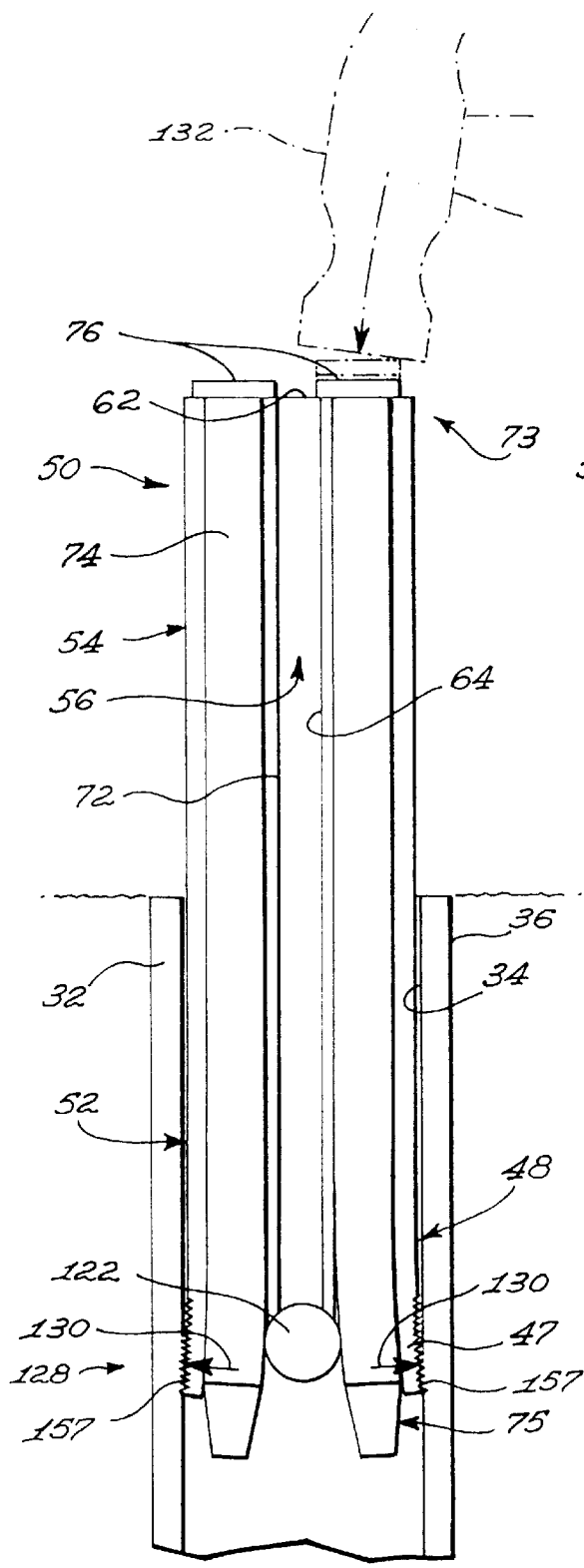
FIG. 16: in a longitudinal cross-sectional view, illustrates the connection between an anchoring component, a connecting component and a supporting component part of a signaling post structure in accordance with a fifth embodiment of the present invention, the connecting component being shown with its retention nails being hammered in their corresponding jaw channels.

As illustrated in FIG. 16, the retention nails 74 are then forced longitudinally in the jaw channels 72 and over the diverging rod 122. As the diverging portion 128 passes over the diverging rod 122, the latter abuttingly forces the diverging portion 128 outwardly. The diverging portion 128, in turn, causes a flaring section 47 of the connecting component 46 to flare outwardly, thus biasing a portion of the first friction surface 52 against the anchoring member inner surface 42. The diverging action of the diverging rod 122 is schematically indicated by the arrows 130. FIG. 16 also schematically illustrates part of a conventional hammer 132 shown in phantom lines. The hammer 132 is shown to illustrated one possible although not exclusive method of forcing the retention nails 74 longitudinally through the jaw channels 72 and past the diverging rod 122.

Figure 17:
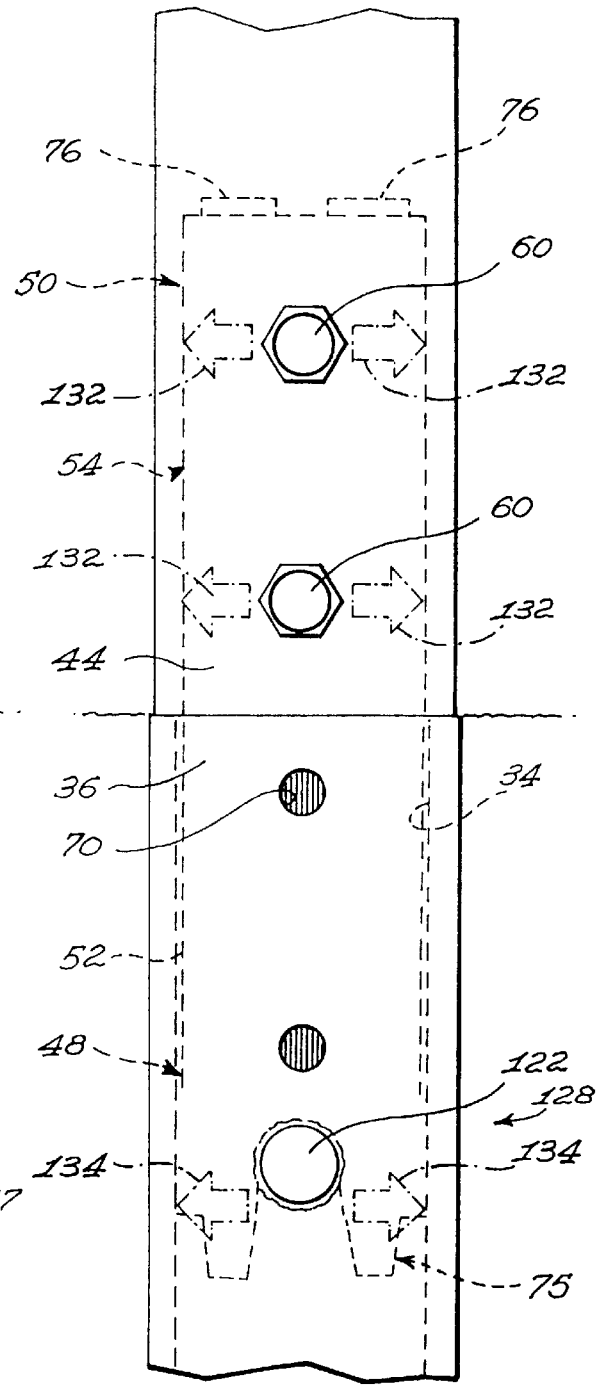
FIG. 17: in an elevational view, illustrates the forces involved by the connection between an anchoring component, a connecting component and a supporting component part of a signaling post structure in accordance with a fifth embodiment of the present invention.

Once the connecting component 46 is frictionally secured to the anchoring component 16, the supporting component 18 is secured to the connecting component 46 in a manner similar to that described previously for the post structure 10. FIG. 17 schematically indicates the frictional forces involved for securing the connecting component both to the anchoring component 16 and to the supporting component 18 when the diverging rod 122 is used. The arrows 132 schematically indicate the frictional forces created by the bolt-type components 60 while the arrows 134 schematically indicate the frictional forces created by the diverging rod 122.

FIGS. 18 through 21 illustrate a post structure 136 in accordance with a sixth embodiment of the present invention. The post structure 136 is substantially identical to the post structure 118 and thus, similar reference numerals will be used to designate similar components. One of the main differences between the post structures 136 and 118 resides in the presence of a nail recess section 138 wherein the outer peripheral surface of the retention nails 74 is inwardly recessed. The nail recess section 138 defines a nail proximal section 140 positioned between the nail recess section 138 and the nail first end 73. The nail recess section 138 also defines a nail distal section 142 positioned between the nail recess section 138 and the nail second end 75. The nail recess section 138 further defines a first transitional area 144 and a second transitional area 146 between the nail recess section 138 and respectively the nail proximal section 140 and the nail distal section 142. The first transitional area 144 and the second transitional area 146 both preferably have a generally tapered configuration so as to facilitate the gliding of the retention nails 74 over the diverging rod 122.

The method of frictionnaly securing the first friction surface 52 to the anchoring member inner surface 34 is substantially similar to that used for the post structure 118 except that care must be taken when slidably inserting the retention nails 74 in the jaw channels 72 not to insert the retention nails 74 to far into the jaw channels 72 so that the nail distal section 142 and not the nail recess section 138 overrides the diverging rod 122. Thus, as illustrated more specifically in FIG. 18, typically, the retention nails 74 are only partially inserted in the jaw channels 72. When the nail distal section 142 passes over the diverging rod 122, the latter abuttingly forces the nail distal section 142 outwardly, thus biasing a portion of the first friction surface 52 against the anchoring member imner surface 42.

The post structure 136 is particularly well suited for applications wherein the supporting member 18 and the connecting structure 46 need to be periodically removed. The supporting member 18 can easily be removed using the conventional method described for the previous embodiments. To remove the connecting structure 46, an intended user merely needs to follow the steps illustrated in FIGS. 19 through 21.

As illustrated in FIG. 19, the retention nails 74 are first pushed inwardly further into the jaw channels 72 until the nail distal section 142 clears the diverging rod 122 and the nail recess section 138 overrides the diverging rod 122. As indicated by arrow 148 in FIG. 20, the section of the connecting component 46 that protrudes from the anchoring member 16 is then tilted sidewardly. The tilting action is preferably repeated in various directions. To facilitate the sidewardly tilting action, the supporting member 18 may first be connected back unto the connecting component 46 and used as a lever.

As indicated by the arrow 150, the sideward tilting action creates an abutting force between the flaring section 47 of the retention component 46 and the anchoring component inner surface 34 that tends to straighten the flaring section 47. As indicated by arrow 152 in FIG. 21, once the flaring section 47 is substantially straightened thus reducing the frictional force between the first friction surface 42 and the anchoring member inner surface 52, the connecting component 16 is pulled out of the connecting component 46.

In some situations, it may be desirable to configure and size the bolt-type components 60 and the diverging rod 122 so that the frictional forces indicated by the arrows 134 have a smaller magnitude then the frictional forces indicated by the arrows 132. In such situations, it is sometimes also preferable to create a balance between the frictional forces 132 and 134 such that when a lateral impacting force applied on the post structure 136 reaches a predetermined value, the smaller frictional force 134 allows the connecting component 46 to be ejected from the anchoring component 16.

FIG. 24 illustrates a fuse component mounted on the exterior surface of a post structure in accordance with an embodiment of the present invention. The fuse component preferably takes the form of a fuse plate 152 that is mounted so as to override the junction between the anchoring member second longitudinal end 22 and the supporting member first longitudinal end 24. It should be understood that the fuse component could take any suitable configuration such as the configuration of a ring without departing from the scope of the present invention as long as it overrides the junction between the anchoring member second longitudinal end 22 and the supporting member first longitudinal end 24. The fuse plate 152 preferably has a pair of apertures extending therethrough for receiving the bolt-type components 60. The fuse plate 152 is made of a material that is more susceptible to deform upon impact then the connecting component 46. A fuse plate notch 156 is preferably formed on said fuse plate 152 for creating a preferential weakness area about which the fuse plate 152 is adapted to initially deform upon impact. Much like a fuse in an electrical circuit, the fuse plate 152 is adapted to shear upon moderate impact and thus prevent damage to the connecting component 46. The strategic positioning of the fuse plate makes it relatively easy to change when damaged.

Numerous modifications, variations and adaptations may be made to the particular embodiment of the invention hereinabove described without departing from the scope of the invention as defined in the claims.

The embodiments of the invention in which an exclusive privilege or property is claimed are defined as follows:

1. A post structure comprising:

a substantially elongated anchoring member, said anchoring member having an anchoring member first end and a longitudinally opposed anchoring member second end; said anchoring member having an anchoring member hollow section that extends longitudinally into said anchoring member second end, said anchoring member hollow section being peripherally delimited by an anchoring member peripheral wall, said anchoring member peripheral wall defining an anchoring member inner surface and an anchoring member outer surface;

a substantially elongated supporting member, said supporting member having a supporting member first end and a longitudinally opposed supporting member second end; said supporting member having a supporting member hollow section that extends longitudinally into said supporting member first end, said supporting member hollow section being peripherally delimited by a supporting member peripheral wall, said supporting member peripheral wall defining a supporting member inner surface and a supporting member outer surface;

a connecting component, said connecting component having a connecting component first section and a connecting component second section, said connecting component first section and said connecting component second section being configured and sized so as to be respectively insertable into said anchoring member hollow section and said supporting member hollow section; said connecting component first section and said connecting component second section respectively defining a first friction surface and a second friction surface, said connecting component defining a longitudinally extending slot having a slot longitudinal axis and a slot transversal axis, said slot defining a pair of jaw members, said jaw members being at least partially separated by said slot;

and jaw spreading means adapted to radially expand said connecting component thereby causing said first and second friction surfaces to respectively frictionally engage said anchoring member inner surface and said supporting member inner surface to hold said anchoring member and said supporting member in an end-to-end relationship, said jaw spreading means including a wedge means having a generally elongated configuration and adapted to be longitudinally inserted within said connecting component from one end of said connecting component to spread away said jaw members thereby radially expanding said connecting component.

2. A post structure as recited in claim 1 wherein a hollow jaw channel extends longitudinally through at least one of said jaw members and a retention nail extends longitudinally through said jaw channel; said retention nail including an elongated strip of relatively ductile material that defines a nail first end and a longitudinally opposed nail second end.

3. A post structure as recited in claim 1 wherein said slot extends partially across said connecting component in the direction of said slot transversal axis so as to define a hinge section about which said jaw members are adapted to pivot.

4. A post structure as recited in claim 3 wherein said slot defines a pair of opposed slot walls positioned on each side of said slot transversal axis that merge towards each other in a radial direction leading into said connecting component so that said slot defines a generally 'V'-shaped cross-sectional configuration.

5. A post structure as recited in claim 1 wherein said wedge means include a wedging component, said wedging component having a wedging component first end and a longitudinally opposed wedging component second end; an external wedging thread being formed on said wedging component adjacent said wedging component first end and a nut being threadably mounted on said wedging thread; said wedging component also defining a wedge abutment segment adjacent said wedging component second end, said wedge abutment segment having an outwardly beveled configuration in a direction leading away from said wedging component first end; said wedging component being longitudinally inserted in said slot with said edge abutment segment abutting against a longitudinal end of said connecting component first section and said nut contacting a longitudinal end of said connecting component second section; whereby, said nut is adapted to be used for varying the depth of insertion of said wedge abutment segment in said slot and said depth of insertion is adapted to influence the spacing between said jaw members.

6. A post structure as recited in claim 4 wherein said slot is provided with a slot thread extending integrally from said slot walls and said jaw spreading means includes a bolt that is threadably inserted into said slot in the direction of said slot transversal axis so as to bias said jaw members away from each other.

7. A post structure as recited in claim 2 wherein said jaw spreading means includes a diverging component that extends transversally through said anchoring member and that is configured and sized so as to force a diverging portion part of said retention nail to diverge outwardly; whereby said diverging portion is adapted to cause a flare section part of said connecting component to flare outwardly so that a portion of said first friction surface is biased against said anchoring member inner surface.

8. A post structure as recited in claim 7 wherein said diverging component includes a diverging rod that is nested in a transversally extending connecting component recess formed in said connecting component, said connecting component recess extending between said jaw members in a direction substantially parallel to said slot transversal axis, said connecting component recess being sized so as to intercept said jaw channels.

9. A post structure as recited in claim 8 further comprising a nail recess section formed on said retention nail wherein the outer peripheral surface of said retention nail is inwardly recessed, said nail recess section defining a nail proximal section positioned between said nail recess section and said nail first end; said nail recess section also defining a nail distal section positioned between said nail recess section and said nail second end.

10. A post structure as recited in claim 9 further comprising a first transitional area and a second transitional area both formed on said retention nail between said nail recess section and respectively said nail proximal section and said nail distal section, said first transitional area and said second transitional area having a generally tapered configuration.

11. A post structure as recited in claim 1 wherein said connecting component has a priming notch formed thereon for creating a weakness area about which said connecting component will deform upon lateral impact.

12. A post structure as recited in claim 1 further comprising a textured marking formed on said first friction surface for increasing the frictional force between a portion of said first friction surface and a corresponding portion of said anchoring member inner surface.

13. A post structure as recited in claim 1 further comprising a fuse plate mounted on the exterior surface of both said anchoring member and said supporting member so as to override the junction between the anchoring member second longitudinal end and the supporting member first longitudinal end, said fuse plate being made of a material that is more susceptible to deform upon impact than said connecting component.

14. A post structure as recited in claim 13 further comprising a fuse plate notch formed on said fuse plate for creating a preferential weakness area about which said fuse plate is adapted to initially deform upon impact.

15. A post structure as recited in claim 1 wherein said anchoring member, said supporting member and said connecting component all have a generally oval cross-sectional configuration.

16. A post structure as defined in claim 1, wherein said anchoring member and said supporting member have a greater resistance to impact than said connecting component.

17. A device for coupling a supporting member to an anchoring member forming part of a post structure, said supporting and anchoring members each defining a hollow end portion, said device comprising a connecting component adapted to be received in said hollow end portions of said anchoring member and said supporting member, said connecting component having a pair of opposed jaw members separated at least by a longitudinal slot having a longitudinal axis and a transversal axis, at least one of said jaw members defining a longitudinal channel receiving therein an elongated member, jaw spreading means adapted to spread said jaw members away from each other thereby causing said connecting component to engage an inner surface of each said hollow end portion to attach said anchoring member and said supporting member together, said jaw spreading means including a diverging component configured and dimensioned to force a portion of said elongated member to diverge outwardly when pushed against said diverging component thereby causing a portion of said connecting component to flare outwardly so as to engage said inner surface of said anchoring member.

18. A device as defined in claim 17, wherein a longitudinal channel is defined in each jaw member, each longitudinal channel receiving therein one elongated member, and wherein said diverging component includes a diverging rod that is nested in a transversally extending recess formed in said connecting component, said recess extending between said jaw members in a direction substantially parallel to said slot transversal axis, said recess being sized so as to intercept said channels.

19. A device as defined in claim 18 further comprising a recess section formed on each said elongated member wherein the outer peripheral surface of each said elongated member is inwardly recessed, said recess section defining a proximal section positioned between said recess section and a first end of said elongated member; said recess section also defining a distal section positioned between said recess section and a second end of said elongated member.

20. A device as defined in claim 19 further comprising a first transitional area and a second transitional area both formed on each said elongated member between said recess section and respectively said proximal section and said distal section, said first transitional area and said second transitional area having a generally tapered configuration.

21. A post structure comprising an anchoring member adapted to be secured in a ground means and a supporting member adapted to be superposed on said anchoring member such as to extend above said ground means, a connecting component adapted to be inserted in adjacent hollow end portions of said anchoring and supporting members, said connecting component being adapted to connect said anchoring member and said supporting member together, said connecting component defining at least one longitudinal channel means, and at least one elongated retention member slidably received in said longitudinal channel means, whereby when said connecting component is sheared due to an impact force on said post structure of a first magnitude, said elongated retention member is adapted to coact with said connecting component to prevent said supporting member from separating from said anchoring member, whereas said elongated retention member is adapted to disengage said connecting component such that said supporting member becomes separated from said anchoring member when said connecting component is sheared due to an impact force on said post structure of a second magnitude greater than said first magnitude.

22. A post structure as define in claim 21, wherein two longitudinal channel means are defined in said connecting component, and wherein said retention member comprises one retention nail received in each said longitudinal channel means, and wherein said retention nail has a head which is adapted to abuttingly contact peripheral edges of said longitudinal channel means.

23. A post structure as defined in claim 21, wherein said elongated retention member is at least partly formed of a relatively ductile material.

24. A post structure as defined in claim 23, wherein said elongated retention member is adapted to bend upon shearing of said connecting component and to engage an inner surface of said channel means.

25. A post structure as defined in claim 21, wherein said connecting component includes a pair of opposed jaw members separated at least by a longitudinal slot having a longitudinal axis and a transversal axis, said longitudinal channel means being defined in at least one of said jaw members, and wherein jaw spreading means are provided to spread said jaw members away from each other thereby causing said connecting component to engage an inner surface of each said hollow end portion to attach said anchoring member and said supporting member together, said jaw spreading means including a diverging component configured and dimensioned to force a portion of said elongated retention member to diverge outwardly when pushed against said diverging component thereby causing a portion of said connecting component to flare outwardly so as to engage said inner surface of said anchoring member.

26. A post structure comprising:

a substantially elongated anchoring member, said anchoring member having an anchoring member first end and a longitudinally opposed anchoring member second end; said anchoring member having an anchoring member hollow section that extends longitudinally into said anchoring member second end, said anchoring member hollow section being peripherally delimited by an anchoring member peripheral wall, said anchoring member peripheral wall defining an anchoring member inner surface and an anchoring member outer surface;

a substantially elongated supporting member, said supporting member having a supporting member first end and a longitudinally opposed supporting member second end; said supporting member having a supporting member hollow section that extends longitudinally into said supporting member first end, said supporting member hollow section being peripherally delimited by a supporting member peripheral wall, said supporting member peripheral wall defining a supporting member inner surface and a supporting member outer surface;

a connecting component, said connecting component having a connecting component first section and a connecting component second section, said connecting component first section and said connecting component second section being configured and sized so as to be respectively insertable into said anchoring member hollow section and said supporting member hollow section;

said connecting component being adapted to connect said anchoring member and said supporting member together;

said anchoring member and said supporting member having a greater resistance to impact than said connecting component;

and a fuse plate mounted on an exterior surface of each said anchoring member and said supporting member so as to override a junction between said anchoring member second longitudinal end and said supporting member first longitudinal end, said fuse plate being made of a material that is more susceptible to deform upon impact than said connecting component.

27. A post structure as defined in claim 26 further comprising a fuse plate notch formed on said fuse plate for creating a preferential weakness area about which said fuse plate is adapted to initially deform upon impact.

* * * * *

UNITED STATES PATENT AND TRADEMARK OFFICE
CERTIFICATE OF CORRECTION

PATENT NO : 5,860,253
DATED : January 19, 1999
INVENTOR(S): Jean Lapointe

It is certified that error appears in the above-identified patent and that said Letters Patent is hereby corrected as shown below:

Title page,
Please add the following to Item [56] References Cited:

-- 5,061,000　　10/91　　Haugen et al.
　 3,381,427　　5/68　　 Watson
　 2,645,509　　7/53　　 Valenta
　 2,850,304　　9/58　　 Wagner
　 4,344,719　　8/82　　 Thom
　 5,480,121　　1/96　　 Rice et al.
　 5,214,886　　6/93　　 Hugron
　 5,642,957　　7/97　　 Lange
　 5,219,449　　6/93　　 Hoshino
　 5,203,135　　4/93　　 Bastian
　 4,859,109　　8/89　　 Targetti
　 4,657,426　　4/87　　 Targetti --

Signed and Sealed this

Thirtieth Day of May, 2000

Attest:

Q. TODD DICKINSON

*Attesting Officer*　　　　*Director of Patents and Trademarks*